United States Patent [19]

Schuette

[11] 4,079,709
[45] Mar. 21, 1978

[54] IGNITION SPARK TIMING LOGIC ENABLED PHASE GENERATOR

[75] Inventor: Gunter Schuette, Franklin Park, Ill.

[73] Assignee: Motorola, Inc., Schaumburg, Ill.

[21] Appl. No.: 662,645

[22] Filed: Mar. 1, 1976

[51] Int. Cl.² .................................................. F02P 5/04
[52] U.S. Cl. .................................................. 123/117 D
[58] Field of Search ...................... 123/117 D, 117 R; 328/60, 67

[56] References Cited

U.S. PATENT DOCUMENTS 3,901,201  8/1975  Mizuguchi ...................... 123/117 R

FOREIGN PATENT DOCUMENTS 2,252,026  6/1975  France ............................ 123/117 D Primary Examiner—Donald B. Cox
Attorney, Agent, or Firm—Phillip H. Melamed; James W. Gillman; Donald J. Lisa

[57] ABSTRACT

A spark timing circuit for use with the ignition system of an internal combustion engine is disclosed. Two sensors produce periodic digital logic signals which have frequencies related to the speed of the engine rotation and which differ by a predetermined amount of phase. These signals are coupled as inputs to a first exclusive OR gate which produces an output signal having logic states which correspond to the coincidence and non-coincidence of the logic states of the two input signals, the duration of one of the logic states of the output signal therefore being directly related to the phase difference between the first and second sensor signals. An adjustable pulse generator circuit then receives this output signal and produces a new corresponding synchronized digitial output signal having the duration of one of its logic states equal to an adjustable proportion of the phase difference logic state duration of the first exclusive OR gate output signal. This new output signal and one of the sensor signals are then coupled as inputs to a second exclusive OR gate. The output of the second OR gate then either represents one of the sensor signals which is totally shifted by an adjustable amount of phase (a first embodiment of the invention) or the output of the second OR gate is used to subsequently create a synchronized signal which corresponds to one of the sensor signals which is totally shifted by an adjustable amount of phase (a second embodiment of the invention). Thus an adjustable amount of total phase shift for a spark timing ignition signal has been produced by a simplified logic circuit which receives two sensor signals which differ by a predetermined amount of phase. The present invention is illustrated in a spark timing ignition system in which an advanced spark timing signal, a retarded spark timing signal or a zero phase (base) spark timing signal is selected by the logic inputs to a plurality of selector logic gates.

15 Claims, 18 Drawing Figures

IGNITION SPARK TIMING LOGIC ENABLED PHASE GENERATOR

BACKGROUND OF THE INVENTION

The invention relates generally to the field of circuitry which produces an output signal having an adjustable amount of phase with respect to an input signal. The invention more particularly relates to the use of such an adjustable phase circuit in the ignition spark timing circuitry for an internal combustion engine.

In electronic ignition systems for internal combustion engines, it is generally desirable to produce a spark timing ignition signal at the spark plugs of the engine at a fixed time with respect to the rotational position of the crankshaft of the engine. Typically, a reluctor is synchronously rotated with respect to the crankshaft of the engine and a stationary magnetic pickup coil is used to produce an AC signal related to the rotational movement of the crankshaft of the engine. This AC signal is conventionally coupled to a transistor or other type of semiconductor device, and a substantially digital logic signal which has a frequency related to the speed of the engine and leading and trailing edges which have a precise relationship to the rotational position of the crankshaft is produced. This digital logic signal is subsequently used to produce spark plug ignitions at predetermined angular positions of the crankshaft. The term "leading edge", as used herein, refers to a low to high logic state transition of a digital signal, while the term "trailing edge" refers to a high to low logic transition.

The digital logic signal produced by the sensor is used to produce a spark timing signal having an adjusted phase to provide for the proper time occurrence of the spark plug ignition with respect to the rotational position of the crankshaft and various engine parameters, such as engine speed and engine vacuum pressure. Generally, the phase adjustment is accomplished by adjusting the time occurrence of either the leading or trailing edge of a timing signal which corresponds to the digital logic sensor signal. One such prior art system is illustrated in a copending U.S. patent application, Ser. No. 537,726, by Chi Sun Lai and Philip Gunderson, which is entitled "An Electronic Spark Timing Adjustment Circuit" and which is assigned to the same assignee as the present invention. In this prior art system the leading or trailing edge of a digital sensor signal is adjusted by a controllable predetermined amount of phase so as to produce a desired spark timing signal. The prior art system is satisfactory for providing a time occurrence adjustment for the occurrence of a spark plug ignition. However, this signal edge adjustment technique commonly can result in altering the dwell (coil excitation time) for the ignition system. Such a result is obviously not desirable since the dwell time should be independent of the spark timing adjustment. Generally, prior art ignition systems have not provided any simplified circuitry which would provide for an adjustable total phase shifting of a signal whereby both the leading and trailing edges of the signal are uniformly shifted by an adjustable predetermined amount of phase.

SUMMARY OF THE INVENTION

It is therefore an object of the present invention to provide an improved and simplified circuit for electronically totally phase shifting a signal by an adjustable amount of phase.

It is an additional object of the present invention to provide an improved electronic ignition system in which either a spark advance timing signal or spark retard timing signal is selected.

The present invention is broadly concerned with receiving two synchronized periodic input signals having leading and trailing edges and which differ by a predetermined amount of phase. The invention then produces an output signal which is synchronized to said input signals and which corresponds to one of the input signal which has been totally phase adjusted by a desired amount. A comparison means is used to produce a digital signal that is subsequently used to produce the output signal. The comparison means receives the two input signals and produces a digital signal having its leading edges corresponding to all of the leading and trailing edges of one of the input signals and its trailing edges corresponding to all of the leading and trailing edges of the other of the two input signals.

In a preferred embodiment of the present invention, a spark timing circuit for use with the ignition system of an internal combustion engine is described. The spark timing circuit comprises: a first comparison apparatus for receiving first and second synchronized digital input signals having a predetermined phase difference between them and magnitudes varying between first and second logic states, the first comparison apparatus producing a third digital signal having first logic states during the time coincidence of identical logic states by the first and second signals and second logic states during other times, the duration of one of said logic states of said third signal thereby being directly related to the phase difference between the first and second signals; circuit means for receiving said third signal and developing a fourth synchronized digital signal comprising first and second logic states with one of these logic states corresponding to one of said first and second logic states of said third signal and having a duration equal to an adjustable proportion of the duration of said corresponding third signal logic state; and second comparison means for receiving said fourth signal and said first signal and producing a fifth synchronized digital signal having first logic states during the time coincidence of identical logic states by said first and fourth signals and second logic states during other times, whereby a synchronized signal is ultimately developed which corresponds to one of said first and second signals being totally shifted by an adjustable amount of phase and this phase shifted signal is used to produce spark plug ignitions for an internal combustion engine. In this preferred embodiment of the present invention, the first and second comparison apparatus comprise exclusive OR gates and the circuit means comprises a prior art circuit which is illustrated in the previously mentioned co-pending U.S. patent application.

The present invention is also illustrated as being incorporated in an ignition spark timing system in which either an ignition spark advance signal or an ignition spark retard signal is selected by logic circuitry in response to various engine conditions.

BRIEF DESCRIPTION OF THE DRAWINGS

For a more complete understanding of the invention reference should be made to the drawings, in which.

DESCRIPTION OF THE PREFERRED EMBODIMENTS

Figure 1:
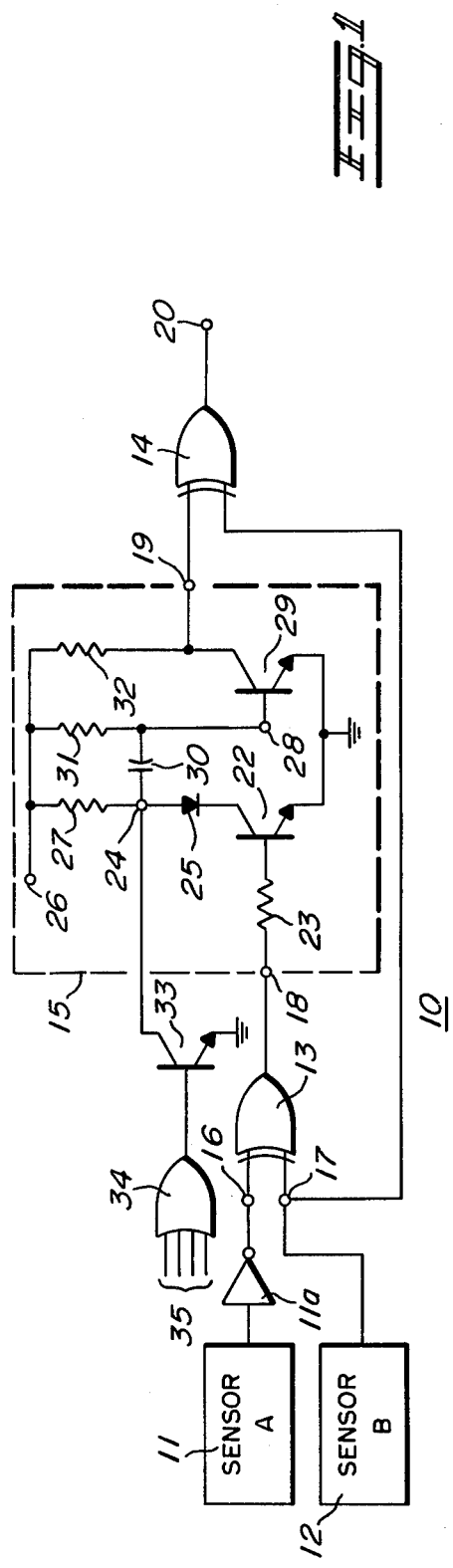
FIG. 1 is a block and schematic diagram of a spark timing circuit for use with the ignition system of an internal combustion engine.

FIG. 1 illustrates a spark timing circuit 10 which basically comprises first and second sensors 11 and 12, a first exclusive OR gate 13, a second exclusive OR gate 14, and a circuit 15 which receives output signals from the OR gate 13 and develops corresponding signals which are coupled to the OR gate 14.

The sensors 11 and 12 comprise magnetic pickup coils or hall sensors which are located at fixed rotational positions with respect to a rotating element (not shown) which revolves in synchronization with the rotary motion of the crankshaft of an internal combustion engine (not shown). Such sensors are known to have been used in electronic ignition systems to develop AC output signals having a frequency related to the engine speed and leading and trailing edges having a precise relationship to the rotational position of the crankshaft of the engine. The outputs of the sensors 11 and 12 are coupled to terminals 16 and 17, respectively, sensor 11 being coupled to terminal 16 through an inverter 11a which inverts the signal produced by the sensor 11.

The exclusive OR gate 13 receives an input signal from each of the terminals 16 and 17 and produces an output signal which is coupled to an input terminal 18 of the circuit 15. The circuit 15 develops output signals at an output terminal 19 and the exclusive OR gate 14 receives inputs from the terminal 19 and the terminal 17 and produces a spark timing output signal at an output terminal 20.

The sensors 11 and 12 are positioned with respect to each other such that a predetermined fixed amount of angular distance exists between them and therefore a fixed amount of angular phase exists between the signals produced by the sensor 11 and the signals produced by the sensor 12. The sensor 12 is considered to produce a base timing signal in which the leading or trailing edges of the output signal of this sensor correspond to a predetermined rotational position of the crankshaft which corresponds to a reference position of the cylinders of the engine, such as top dead center. The sensor 11 produces a signal synchronized with the output signal of the sensor 12, but having leading and trailing edges which occur at a fixed amount of angular advance before the occurrence of the corresponding leading and trailing edges of the signal produced by sensor 12. Thus in the preferred embodiment of the present invention illustrated in FIG. 1, sensor 12 produces a base spark timing signal and sensor 11 produces an advance spark timing signal which has a predetermined amount of angular phase advance with respect to the base signal of sensor 12.

The sensors are contemplated as providing output signals to the OR gate 13 which are substantially digital in nature and have magnitudes which vary between first and second logic states. Each of the sensors 11 and 12 is contemplated as comprising not only a magnetic pickup coil or hall sensor to produce an AC varying signal in response to the rotation of the crankshaft of the engine, but also as having circuitry for processing the signals produced by the magnetic pickup or hall sensor and thereby producing a digital output signal having a substantial magnitude.

The exclusive OR gate 13 basically functions as a comparison means for receiving and comparing the synchronized output signals of the sensors 11 and 12 which have a predetermined phase difference between them. The exclusive OR gate 13, which is a logic circuit well known to those of average skill in the art, basically produces an output signal having first logic states during the time that the signals at terminals 16 and 17 have identical logic states and second logic states during the time that the signals have different logic states. Since the signals at terminals 16 and 17 differ by a predetermined amount of phase, the duration of one of the logic states produced by the OR gate 13 will correspond to this phase difference. The OR gate 13 can also be described as a comparison apparatus for two digital input signals which produces a digital output signal having its leading edges corresponding to both the leading and trailing edges of one of the input signals and its trailing edges corresponding to both the leading and trailing edges of the other input signal. The operation of the OR gate 13 can best be illustrated by referring to the waveforms shown in FIGS. 2A-2C.

Figure 2:
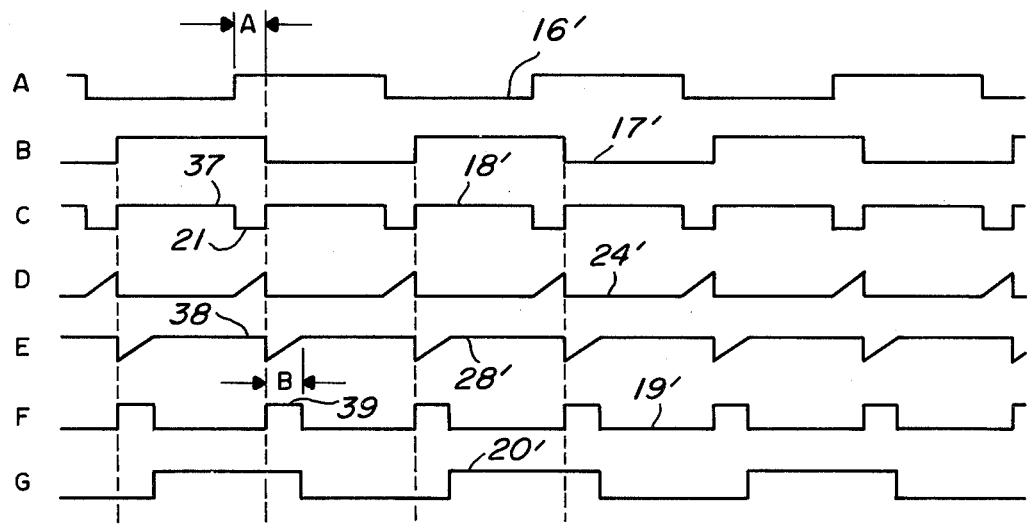
FIGS. 2A-2G are a series of graphs which illustrate the waveforms created by the spark timing circuit illustrated in FIG. 1.

FIG. 2A illustrates the inverted digital output signal of the sensor 11. Since this signal is present at the terminal 16, the number 16' is used to designate this waveform. Similarly, numbers 17' and 18' are used to designate the waveforms illustrated in FIGS. 2B and 2C, respectively, as representing the signals at terminals 17 and 18. All subsequent waveforms will be similarly identified. FIGS. 2A and 2B illustrate that the output of sensor 11 differs from the base waveform 17' by a fixed amount of phase A. Thus the leading and trailing edges of this output signal occur at a time before the occurrence of the corresponding leading and trailing edges of the waveform 17'. FIG. 2C illustrates that the waveform 18' has low logic states 21 whose durations are directly related to the magnitude of the phase difference A. In addition, FIG. 2C illustrates the leading edges of waveform 18' as corresponding to the leading and trailing edges of waveform 17' and the trailing edges of waveform 18' as corresponding to the leading and trailing edges of waveform 16'. The significance of the waveform 18' will be discussed subsequently.

The circuit 15 comprises an NPN transistor 22 having its base coupled to the terminal 18 through a resistor 23, its emitter coupled directly to ground and its collector coupled to a terminal 24 through a diode 25 which has its anode directly connected to the terminal 24. A positive (B+) voltage supply terminal 26 is connected to the terminal 24 through a resistor 27 which therefore supplies collector current to the transistor 22. The terminal 24 is AC coupled to a terminal 28, which corresponds to the base of an NPN transistor 29, by a capacitor 30. A resistor 31 is coupled between the terminal 28 and B+ and supplies base bias current to the transistor 29. The emitter of the transistor 29 is directly connected to ground and the collector is directly connected to the terminal 19 and connected to B+ through a load resistor 32. The components 22–32 all generally comprise the circuit 15.

An NPN transistor 33 is illustrated exterior to the circuit 15 and has its emitter directly connected to ground, its collector directly connected to the terminal 24 and its base connected to the output of an OR gate 34 which receives a plurality of input logic signals 35 which are representative of various engine conditions. The logic signals 35 have high logic states in response to various engine sensors determining such things as the engine temperature being above a certain minimum and/or the engine manifold vacuum pressure being below a certain level.

The operation of the circuit 15 will now be discussed and subsequently the operation of the components 33–35 will be considered with respect to the operation of the circuit 15.

As previously stated, the signal present at the terminal 18 corresponds to the waveform 18' illustrated in FIG. 2C. This waveform has low logic states 21 which are related to the phase difference between the waveforms 16' and 17'. Waveform 18' also has high logic states 37. During the occurrence of a high logic state 37, the transistor 22 will be saturated and this results in maintaining the terminal 24 at a low voltage level, approximately one diode drop above ground potential. During a low logic state 21, the transistor 22 will be rendered inoperative and the resistor 27 will supply a current to the capacitor 30 which will result in the raising of the voltage at the terminal 24. At the next occurrence of a high logic state 37, the transistor 22 will once again be saturated and the voltage at the terminal 24 will rapidly decrease to one diode drop above ground potential.

FIG. 2D illustrates a waveform 24' which corresponds to the voltage produced at the terminal 24. The rate of rise of this voltage during the logic state 21 is determined by the magnitudes of the resistor 27 and the capacitor 30, whereas the fall time of this voltage depends upon the magnitude of capacitor 30 and the series resistance of the saturated transistor 22 and the forward biased diode 25. Thus a controlled rise time voltage is produced during the logic state 21 and an extremely rapid fall time occurs with the subsequent occurrence of a logic state 37.

FIG. 2E illustrates a waveform 28' which represents the signal at the terminal 28 which is created in response to the waveform 24' being created at the terminal 24. Generally, the voltage at the terminal 28 will remain at a positive magnitude 38, which is sufficient to turn on the transistor 29, until the occurrence of an abrupt transition in the voltage at the terminal 24. This abrupt transition will occur upon the transition of the waveform 18' from the logic state 21 to the logic state 37. The abrupt transition at terminal 24 will result in an equal and opposite polarity abrupt change in the voltage present at the terminal 28. Subsequently the resistor 31 will supply a current to the capacitor 30 to raise the voltage present at the terminal 28 to its previous positive level. The rate of rise of the waveform 28' will be determined by the magnitudes of the resistor 31 and the capacitor 30.

FIG. 2F illustrates a waveform 19' which represents the signal present at the terminal 19 (the collector of the transistor 29) in response to the waveform 28' being present at the base of the transistor 29. The terminal 19 is held at substantially ground potential during the existence of the positive voltage 38, since this voltage will saturate the transistor 29. During the portion of the waveform 28' when the voltage at the base of the transistor 29 is below the voltage level 38, the transistor 29 will be turned off and the voltage at the terminal 19 will substantially correspond to the B+ voltage at the terminal 26. This portion of the waveform 19' is illustrated in FIG. 2F by the reference number 39.

The structure, operation, and advantages of the circuit 15 are discussed in detail in the corresponding patent application which was previously mentioned. Basically, the circuit 15 is used to produce a waveform (19') having a pulse width (39) which is equal to an adjustable proportion of the duration of one of the logic states (21) of an input signal (18'). The duration of the logic state 39 can be shown to depend upon the duration of the logic state 21 and the ratios of the magnitudes of the resistors 31 and 27. In the present embodiment, it is contemplated that the resistor 31 is adjustable, such that the duration of the logic state 39 can be adjusted to provide an adjustable proportion of the duration of the logic state 21.

It should be noted that FIG. 2F illustrates pulses which commence both at the leading and trailing edges of the waveform 17' and have durations which are an adjustable proportion of the phase difference between the waveforms 16' and 17'. The previously referred to patent application merely generates adjustable duration pulses at either the leading or trailing edges of an input signal, such as 17', and then proceeds to adjust the leading or trailing edges by the duration of these pulses. Thus the prior art does not totally phase shift an input signal but only phase shifts either the leading or trailing edge of an input signal. By shifting only one edge of the input signal, the prior art alters the relationship between the durations of the two logic states of the input signal. In many cases this will result in an undesirable effect since the time duration between the leading and trailing edges may also contain necessary spark ignition information, such as dwell time. The present invention, by way of contrast, uses circuit 15 to produce a waveform 19' having pulse durations 39 which occur at both the leading and trailing edges of an input signal 17' and the duration of these pulses 39 corresponds to an adjustable predetermined amount of angular phase. The present invention creates the waveform 19' by producing the waveform 18' which has leading edges corresponding to both the leading and trailing edges of waveform 17' and using waveform 18' as the input signal for circuit 15.

The waveforms 19' and 17' are combined by the exclusive OR gate 14 and result in an output signal 20' which is illustrated in FIG. 2G. The waveform 20' therefore corresponds to the total shifting of the waveform 17' by an angular phase B which is illustrated as being identical to the duration of the logic state 39 of the waveform 19'. Thus the present invention has provided a simple and easily constructed circuit for totally shifting an input digital signal by a predetermined amount of phase.

Components 33–35 relate to the use of the spark timing circuit 10 in an ignition system in which it is desirable to either have the circuit 10 function as described above or to have the output signal of the sensor 12 directly transferred to the terminal 20.

When all of the inputs 35 to the OR gate 34 are negative, the transistor 33 will be in a off condition and the circuit 10 will function as described above and the waveform 20' will be produced at the terminal 20 which corresponds to the waveform 17' adjusted in phase (retarded) by a predetermined amount of phase B. Whenever any one of the inputs 35 to the OR gate 34 is in a positive state, the transistor 33 will be saturated thus causing the terminal 24 to remain at substantially ground potential. This insures that the transistor 29 will always be in an on condition and that the voltage at the terminal 19 will always be at substantially ground potential. Since the signal at terminal 19 is one of the inputs to the exclusive OR gate 14, this will result in the waveform at the terminal 20 corresponding to the other input of the exclusive OR gate 14, which in this case is the waveform 17' produced by the sensor 12. Thus the components 33–35 perform a selection operation whereby either a base spark timing signal 17' is provided at the output terminal 20 or a retarded spark timing signal 20' is provided at the output terminal 20.

The term "advanced" in the present specification refers to a signal whose leading or trailing edges precede the corresponding leading or trailing edges of the base timing signal 17' and the term "retarded" in the present specification refers to a signal whose leading and trailing edges occur after the occurrence of the leading and trailing edges of the base signal. Thus the waveform 16' is seen to be an inverted advanced timing signal and waveform 20' is a retarded timing signal.

In many internal combustion engines it is desirable to provide for a base spark timing signal in response to one set of engine conditions, an advanced spark timing signal in response to another set of engine conditions, and a retarded spark timing signal in response to a third set of engine conditions. The circuit 10 provides a simplified circuit for implementing the selecting of a base or retarded spark timing signal in response to a plurality of engine conditions. In addition, the spark timing circuit 10 has the added advantage of always providing some useable spark timing signal at the terminal 20 whenever a retarded signal is to be selected, even if one of the sensors 11 and 12 undergoes a catastrophic failure. This is accomplished by the exclusive OR gate 13 combining the outputs of the sensors 11 and 12 and producing an output signal 18' which is related to both of the input signals. Thus if either of the sensors 11 or 12 undergoes a failure and does not produce an alternating logic signal, a digital logic signal will still be produced at the terminal 18 and a corresponding output signal which can be used to produce a spark ignition will still be produced at the terminal 20.

Figure 3:
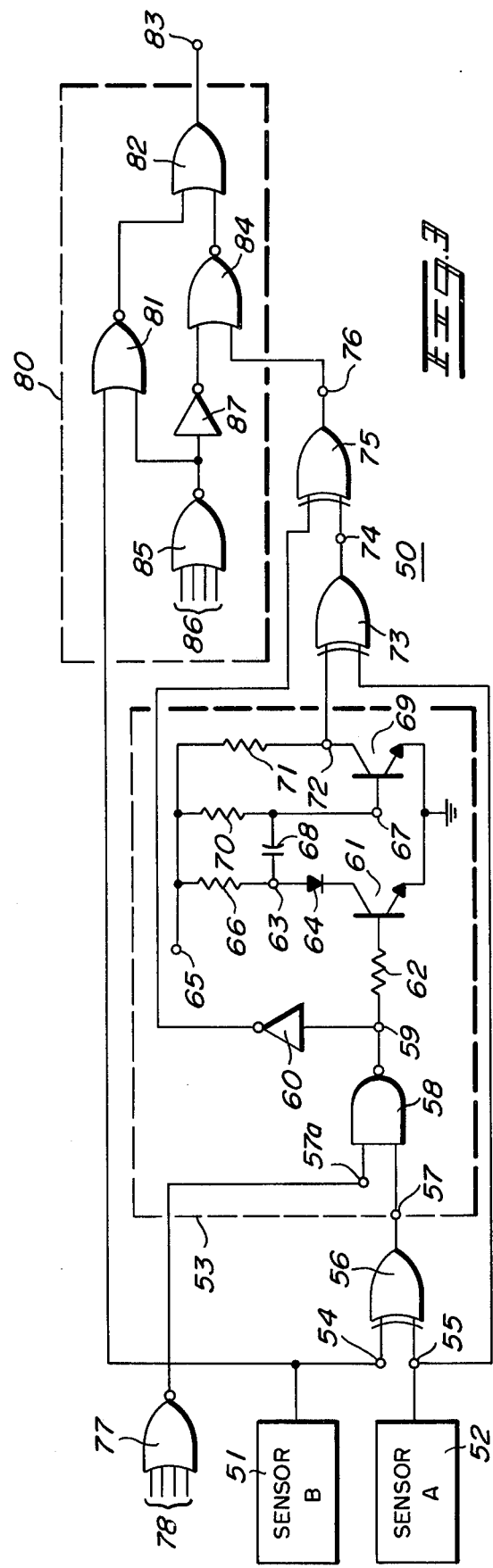
FIG. 3 is a block and schematic diagram illustrating an ignition spark timing system which incorporated the present invention and provides for the selection of an advanced or retarded spark ignition signal.

Referring now to FIG. 3, the present invention is illustrated as being integrated into a total spark timing system 50. The spark timing system 50 provides for selecting either a base timing signal from a sensor 51, an advanced spark timing signal from a sensor 52, or a retarded spark timing signal produced by the combining of the outputs of the sensors 51 and 52 and the processing of the combined signal by a circuit 53. The waveforms illustrated in FIGS. 4A–4I represent the signals produced at various terminals in the system 50 and are identified by corresponding prime notation. These waveforms will be referred to during the discussion of the circuitry which comprises the system 50.

Sensor 51 represents a base timing sensor and therefore corresponds to the sensor 12 in FIG. 1. This base timing sensor produces a signal at an input terminal 54 which corresponds to the waveform 54' illustrated in FIG. 4B. The waveform is a substantially digital waveform having a frequency related to engine speed and leading and trailing edges which correspond to predetermined engine crankshaft rotational positions. The sensor 52 corresponds to the advance sensor 11 in FIG. 1 and produces a signal at an input terminal 55 which is illustrated in FIG. 4A as waveform 55'. An advance phase difference A is illustrated as existing between the waveforms 54' and 55'.

The terminals 54 and 55 are connected as inputs to an exclusive OR gate 56 which has its output connected to a terminal 57 which serves as the input terminal to the circuit 53. The waveform present at the terminal 57 is illustrated in FIG. 4C as a waveform 57'. This waveform exists in response to the occurrence of waveforms 54' and 55' at their respective terminals. The creation of the waveform 57' is substantially identical to the creation of the waveform 18' and therefore will not be discussed in detail.

Terminal 57 is connected as one input to a NAND gate 58 which has its output connected to a terminal 59. The NAND gate also has another input terminal 57a. Terminal 59 is connected directly to the input of an inverter 60 and connected to the base of an NPN transistor 61 through a resistor 62. Transistor 61 has its emitter directly connected to ground and its collector connected to a terminal 63 through a diode 64 having its anode directly connected to the terminal 63. A positive voltage supply terminal 65 is coupled to the terminal 63 through a collector current supplying resistor 66. Terminal 63 is AC coupled to a terminal 67 by a capacitor 68 and the terminal 67 corresponds to the base of an NPN transistor 69. Base current is supplied to the transistor 69 by a resistor 70 connected between terminals 65 and 67, and collector current is supplied to the transistor 69 by a resistor 71 connected between terminal 65 and a terminal 72 which corresponds to the collector of the transistor 69. The emitter of transistor 69 is connected directly to ground. The components 61–72 form a circuit which is structurally and functionally identical to the circuit 15 illustrated in FIG. 1.

Terminal 72 is connected as one input into an exclusive OR gate 73 which receives its other input from the terminal 55 and produces an output signal at a terminal 74. An exclusive OR gate 75 has one input directly connected to the terminal 74 and receives its other input from the output of the inverter 60. The OR gate 75 produces its output signal at an output terminal 76.

The operation of the components 51–76 will now be discussed before the structure and function of the various other logic selecting devices of the system 50 are considered.

In response to the occurrence of the waveform 57' at the terminal 57, the inverse of this signal will appear at the terminal 59 whenever the NAND gate 58 receives a high logic state on its other input terminal 57a. This inverse waveform 59' is illustrated in FIG. 4D. FIGS. 4E–4G illustrate the waveforms present at the terminals 63, 67, and 72, respectively, in response to the occurrence of the waveform 59'. The production of these waveforms is identical to the production of the waveforms 24', 28' and 19' which was previously discussed with respect to the circuit 10 in FIG. 1. Thus FIG. 4G illustrates a waveform 72' having a logic state duration B which is equal to an adjustable proportion of the predetermined phase shift A.

Figure 4:
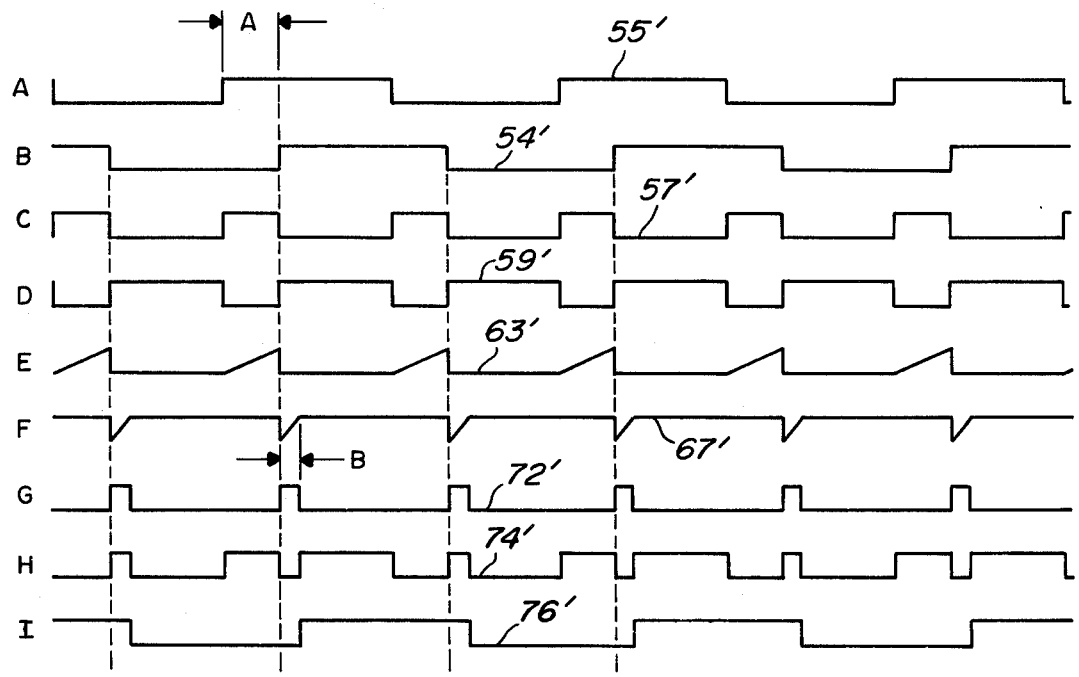
FIGS. 4A-I are a series of graphs which illustrate the waveforms created by the ignition system illustrated in FIG. 3.

The waveform 72' and the waveform 55' are combined by the exclusive OR gate 73 to produce the waveform 74' which is illustrated in FIG. 4H. This waveform is then combined with the output of the inverter 60 (which corresponds to the waveform 57' when a positive logic state is present at the terminal 57a) by the exclusive OR gate 75. The waveform of the output of the OR gate 75 is illustrated in FIG. 4I as a waveform 76' which represents the base spark timing signal 54' totally shifted in phase by a predetermined amount of retard phase B. Thus it can be seen that the structure and function of the components 51-76 in the spark system 50 is identical to the structure and function of the circuit 10 illustrated in FIG. 1 when a positive logic state is present at the terminal 57a (FIG. 4) and no positive logic input signals were received by the OR gate 34 (FIG. 1).

A NOR gate 77 has its output directly connected to the terminal 57a and receives a plurality of engine sensor inputs 78 which represent various engine conditions. Thus when none of the logic lines 78 have a positive logic state, the circuitry discussed so far will produce a retarded base spark timing signal 76' at the terminal 76. Whenever one of the logic lines 78 does have a positive logic state, it can be shown that the waveform present at the terminal 76 will correspond to the waveform 55'. Thus the NOR gate 77 effectively selects the production of either an advanced spark timing signal or a retarded spark timing signal at the terminal 76.

A selection circuit 80 is shown dashed and includes a NOR gate 81 which receives one input directly from the sensor 51 and has its output coupled as an input to an OR gate 82 having an output terminal 83. A NOR gate 84 receives one input from the terminal 76 and produces an output coupled as another input to the OR gate 82. A NOR gate 85 receives a plurality of logic signals 86 from various engine sensors and produces an output which is directly coupled as an input to the NOR gate 81 and coupled as an input to the NOR gate 84 through an inverter 87. The components 81-87 basically comprise the selector circuit 80 which functions to select either the base timing signal or the signal present at the terminal 76 in response to the occurrence of the logic states received on the logic lines 86.

Whenever a positive logic state is present on any of the logic lines 86, the selector circuit 80 will cause the base timing waveform 54' to be present at the output terminal 83. When none of the logic lines 86 have a positive logic state, the selector circuit 80 will produce whatever waveform is present at the terminal 76 at the output terminal 83. The waveform present at the terminal 76 will either be the retarded waveform 76' or the advance waveform 55' depending upon the logic conditions of the input lines 78 to the NOR gate 77. Thus a spark timing ignition system 50 has been provided which selects either the base spark timing, an advanced spark timing, or a retarded spark timing in response to the occurrence of various engine conditions.

While the preferred embodiments of the present invention illustrate the source of the waveforms received by the first exclusive OR gate as being magnetic pickup sensors having a fixed phase difference between the waveforms developed thereby, the present invention is not limited to such structure. The present invention is concerned with the combining of any two substantial digital waveforms which have a known predetermined phase difference between them and the use of this combined signal. The present embodiments illustrate the use of this combined signal in a circuit to produce an output signal which corresponds to one of the input signals totally shifted in phase by a predetermined amount.

While I have shown and described specific embodiments of this invention, further modification and improvements will occur to those skilled in the art. All such modifications which retain the basic underlying principles disclosed and claimed herein are within the scope of this invention.

I claim:

1. A spark timing circuit for use with the ignition system of an internal combusion engine, comprising:
   first comparison means for receiving first and second synchronized digital input signals having a predetermined phase difference between them and magnitudes varying between first and second logic states, said first comparison means producing a third digital signal having first logic states during the time coincidence of identical logic states by said first and second signals and second logic states during other times, the duration of one of said logic states being related to said phase difference;
   circuit means for receiving said third signal and developing a fourth synchronized digital signal comprising first and second logic states, one of said fourth signal logic states corresponding to one of said first and second logic states of said third signal and having a duration equal to an adjustable proportion of the duration of said corresponding third signal logic state; and
   second comparison means for receiving said fourth signal and said first signal and producing a fifth synchronized digital signal having first logic states during the time coincidence of identical logic states by said first and fourth signals and second logic states during other times, whereby a synchronized signal is ultimately developed which corresponds to one of said first and second signals being totally shifted by an adjustable amount of phase and this phase shifted signal is used to produce spark plug ignitions for an internal combustion engine.

2. A spark timing circuit according to claim 1 which includes a first sensor means for producing said first digital signal and wherein said first sensor means includes structure for producing said first signal with a frequency related to the speed of the engine and leading and trailing edges having a precise relationship to the rotational position of a crankshaft of the engine.

3. A spark timing circuit according to claim 2 which includes a second sensor means for producing said second signal, wherein said second sensor means includes structure for producing said second signal with a frequency related to the speed of the engine and with leading and trailing edges having a precise relationship to the rotational position of a crankshaft of the engine, said first and second sensor means being constructed such that a predetermined phase shift exists between said first and second signals.

4. A spark timing circuit according to claim 3 wherein said first comparison means comprises a first exclusive OR type gate having two inputs, one for receiving each of said first and second signals, and an output.

5. A spark timing circuit according to claim 4 wherein said second comparison means comprises a second exclusive OR type gate having inputs for receiving each of said fourth and first signals.

6. A spark timing circuit according to claim 5 wherein said first and second sensor means each comprise a magnetic pickup coil, said pickup coils having a fixed angular distance therebetween.

7. A spark timing ignition system for use with an internal combustion engine, comprising:

a first sensor means for developing a digital signal having a frequency related to the rotational speed of the engine and having leading and trailing edges bearing a precise predetermined relationship to the rotational position of a shaft of an engine;

means for developing a second digital signal having a predetermined phase difference with respect to said first digital signal;

circuit means for receiving said first and second digital signals and producing a third signal synchronized with said first signal and having an adjustable predetermined phase difference, related to said predetermined phase difference between said first and second digital signals, with respect to said first signal; and selector means for selecting one of said first and third signals to be produced at an output terminal in response to various engine conditions, whereby the signal at said output terminal is used to produce spark plug ignitions for the engine.

8. A spark timing ignition system according to claim 7 wherein said circuit means comprises a first exclusive OR gate type means for receiving said first and second signals and producing a signal having logic states whose durations are related to the phase difference between said first and second signals.

9. A spark timing ignition system according to claim 8 wherein said circuit means comprises additional circuitry for receiving the output of said first exclusive OR type gate means and developing an intermediate synchronized digital output signal having logic state durations equal to an adjustable proportion of said phase difference.

10. A spark timing ignition system according to claim 9 wherein said circuit means includes a second exclusive OR type gate means for receiving said intermediate signal and said first signal and producing an output signal coupled to said output terminal.

11. A spark timing circuit for use with the ignition system of an internal combustion engine, comprising:

first means for producing a first digital input signal having a frequency related to the rotational speed of the engine and leading and trailing edges bearing a precise relationship to predetermined rotational positions of a crankshaft of the engine;

means for producing a second digital input signal synchronized with said first signal and having leading and trailing edges having a predetermined phase difference with respect to the leading and trailing edges of said first signal;

comparison means for receiving said first and second digital input signals and producing an output digital signal having its leading edges corresponding to all of the leading and trailing edges of one of said first and second signals and its trailing edges corresponding to all of the leading and trailing edges of the other of said first and second signals;

whereby said output digital signal is subsequently used to develop a further output signal which represents one of said first and second signals having an adjustable predetermined amount of total phase shift added to it and whereby said further output signal is used to produce spark plug ignitions for the engine.

12. A spark timing circuit for use with the ignition system of an internal combustion engine, comprising:

first means for producing a first digital input signal having a frequency related to the rotational speed of the engine, leading and trailing edges bearing a precise relationship to predetermined rotational positions of a crankshaft of the engine and magnitudes varying between first and second logic states;

means for producing a second digital input signal synchronized with said first signal having leading and trailing edges having a predetermined phase difference with respect to the leading and trailing edges of said first signal and magnitudes varying between first and second logic states;

first comparison means for receiving said first and second input signals and producing a synchronized digital output signal, said output signal having first logic states during the time coincidence of identical logic states by said first and second signals and second logic states during other times, the duration of one of said logic states being related to said phase difference;

whereby said output digital signal is subsequently used to develop a further output signal which represents one of said first and second signals having an adjustable predetermined amount of total phase shift added to it and whereby said further output signal is used to produce spark plug ignitions for the engine.

13. A phase generator circuit adaptable for use with the ignition system of an internal combustion engine, comprising:

first means for producing a first digital input signal having a frequency, leading and trailing edges, and magnitudes varying between first and second logic states;

second means for producing a second digital input signal synchronized with said first signal having leading and trailing edges having a predetermined phase difference with respect to the leading and trailing edges of said first signal and magnitudes varying between first and second logic states;

first comparison means for receiving said first and second input signals and producing a third synchronized digital output signal, said third signal having first logic states during the time coincidence of identical logic states by said first and second signals and second logic states during other times, the duration of one of said logic states being related to said phase difference;

whereby said third digital signal is subsequently used to develop a further output signal which represents one of said first and second signals having an adjustable predetermined amount of total phase shift added to it.

14. A phase generator circuit according to claim 13 which includes circuit means for receiving said third signal and developing a fourth synchronized digital signal comprising first and second logic states, one of said fourth signal logic states corresponding to one of said first and second logic states of said third signal and having a duration equal to an adjustable proportion of the duration of said corresponding third signal logic state.

15. A phase generator circuit according to claim 14 which includes second comparison means for receiving said fourth signal and said first signal and producing a fifth synchronized digital signal having first logic states during the time coincidence of identical logic states by said first and fourth signals and second logic states during other times, whereby a synchronized signal is ultimately developed which corresponds to one of said first and second signals being totally shifted by an adjustable amount of phase.

* * * * *